United States Patent [19]

Zouzoulas

[11] 4,063,707
[45] Dec. 20, 1977

[54] VALVE PROTECTIVE MECHANISM FOR POWER OPERATED VALVES

[75] Inventor: John Zouzoulas, King of Prussia, Pa.

[73] Assignee: Philadelphia Gear Corporation, King of Prussia, Pa.

[21] Appl. No.: 651,976

[22] Filed: Jan. 23, 1976

[51] Int. Cl.² .............................................. F16K 31/53
[52] U.S. Cl. .................... 251/79; 64/28 R;
74/424.8 VA; 192/150; 251/249.5
[58] Field of Search ...................... 251/79, 80, 81, 308,
251/249.5, 250.5, 265, 269; 192/30, 141, 150;
74/527, , 424.8 VA; 64/28, 27, 30

[56] References Cited

U.S. PATENT DOCUMENTS

| | | | |
|---|---|---|---|
| 2,150,813 | 3/1939 | Ball | 251/249.5 |
| 2,222,699 | 11/1940 | Ball | 251/249.5 |
| 2,753,030 | 7/1956 | Wight | 251/79 X |
| 2,878,687 | 3/1959 | Kron et al. | 74/424.8 VA |
| 2,933,937 | 4/1960 | Kron et al. | 74/424.8 VA |
| 3,150,536 | 9/1964 | Plume | 74/424.8 VA |
| 3,361,240 | 1/1968 | Cagle | 251/79 X |

Primary Examiner—Martin P. Schwadron
Assistant Examiner—G. L. Walton
Attorney, Agent, or Firm—Paul & Paul

[57] ABSTRACT

A protective mechanism is provided for valves having a nut through which a power-driven valve stem is threaded. The mechanism functions to protect the valve seat against the continuation of thrust of the valve-stem closure element against the valve seat after the valve has been fully closed. The continuation of thrust force, unless prevented, occurs due to inertia of the drive motor after torque-sensing or other means have shut off the power to the motor. The protective mechanism includes energy-absorbing means for absorbing the kinetic energy of the over-running drive motor and for stopping further rotation of the valve stem.

10 Claims, 4 Drawing Figures

VALVE PROTECTIVE MECHANISM FOR POWER OPERATED VALVES

BACKGROUND OF THE INVENTION

This invention relates to valves, and in particular to valves having a nut through which is threaded a power-driven rising (and descending) rotating valve stem.

It is known in the prior art to provide torque-sensing means to sense that the valve has become closed and to use such torque-sensing means to shut off the power to the drive motor.

The present invention is directed to the problem which arises because of the inertia or kinetic energy of the drive motor. This problem is particularly troublesome where high-speed motors are used. Inertial forces cause the motor to continue to run after the power has been shut off, and this causes the continuation of application of a closing force on the valve seat after the closure element has been fully seated. Unless prevented, this tends to damage the valve seat.

SUMMARY OF THE INVENTION

A principal object of the present invention is to provide means for preventing the continuation of application of a closing force on the valve seat due to an over-running motor after the closure element has been fully seated.

The foregoing, as well as other objects and advantages of the invention, are achieved, in accordance with the present invention, by the provision of a protective mechanism which includes energy-absorbing means for absorbing the kinetic energy of the motor, thereby to stop further rotation of the valve stem and prevent the application of further closing force to an already-closed valve.

DETAILED DESCRIPTION OF THE PREFERRED EMBODIMENTS

Figure 1:
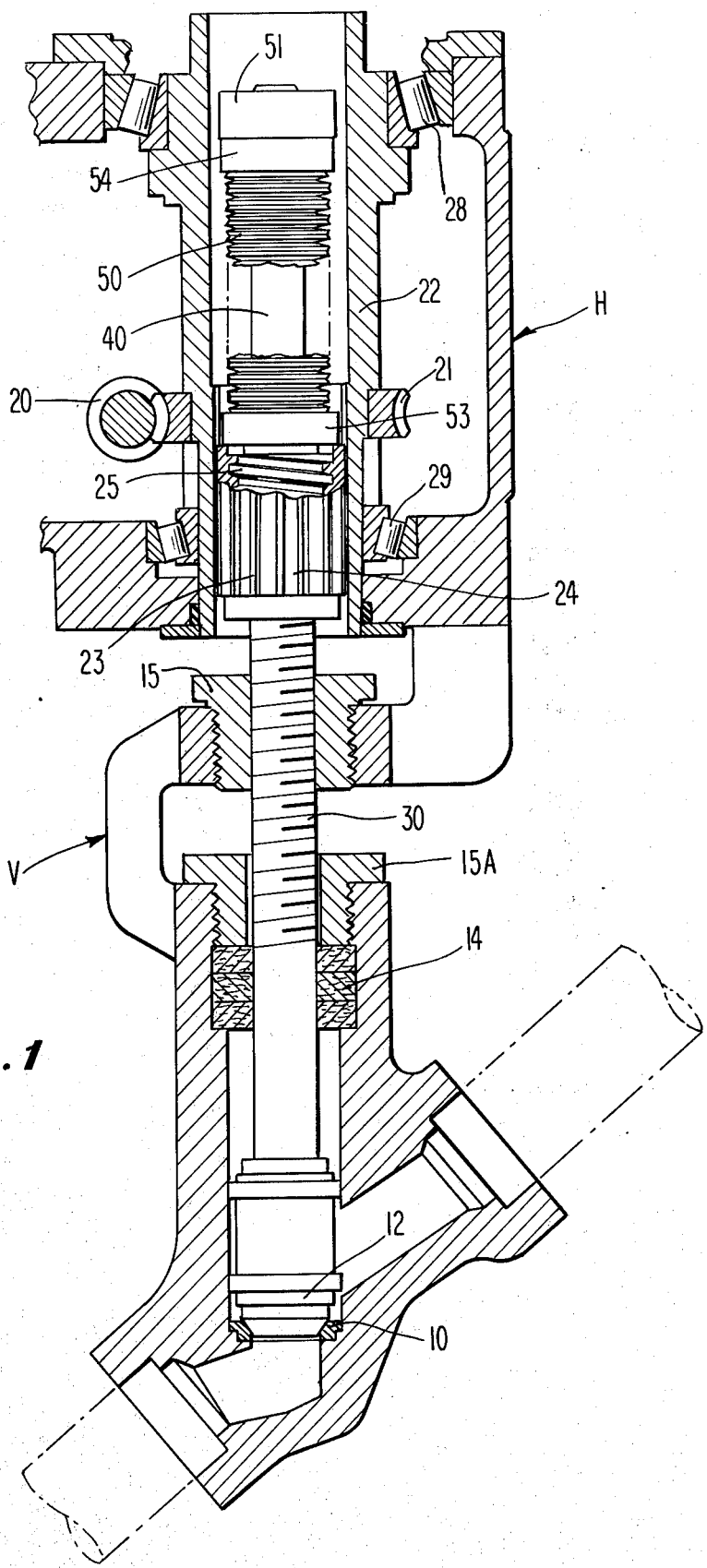
FIG. 1 is a side view, in section, of the protective mechanism of the present invention shown mounted on, and connected to, a typical valve.

In FIG. 1, a valve V is shown having an internally-threaded valve nut 15 which is screwed in to the top of the yoke of the valve. A packing 14, positioned below a nut 15A functions as a mechanical seal. Threaded through nut 15 is an externally-threaded valve stem 30 having a closure element 12 connected to its lower end. Closure element 12 is shown in fully closed position against the valve seat 10.

Mounted on the yoke of valve V is a housing H which contains, in addition to valve stem drive components, the protective mechanism provided in accordance with the present invention.

Figure 4:
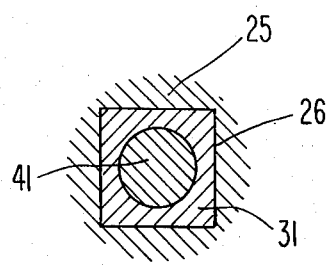
FIG. 4 is a view, in section, along the line 4—4 of FIG. 2.
Figure 3:
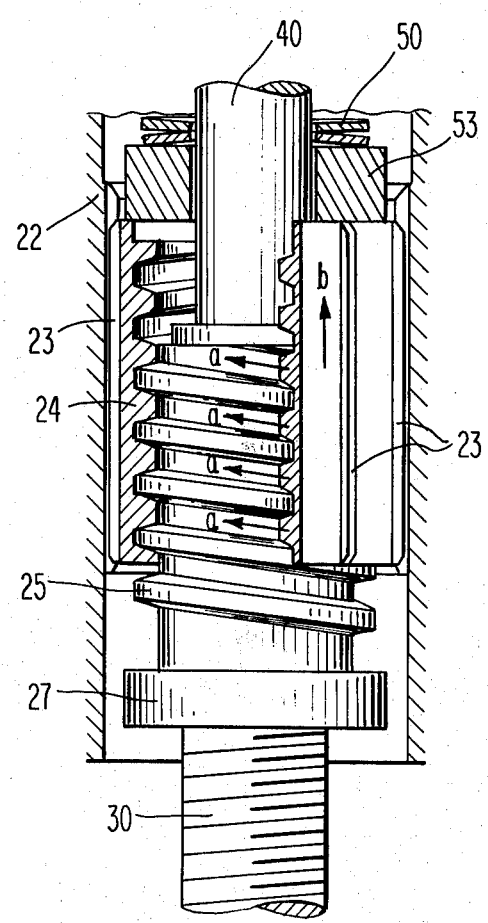
FIG. 3 is a view, partly in section, of a part of the mechanism of FIG. 2 showing the relative positions of the parts after the valve has closed and the inertial kinetic energy of the over-running drive motor has been absorbed.
Figure 2:
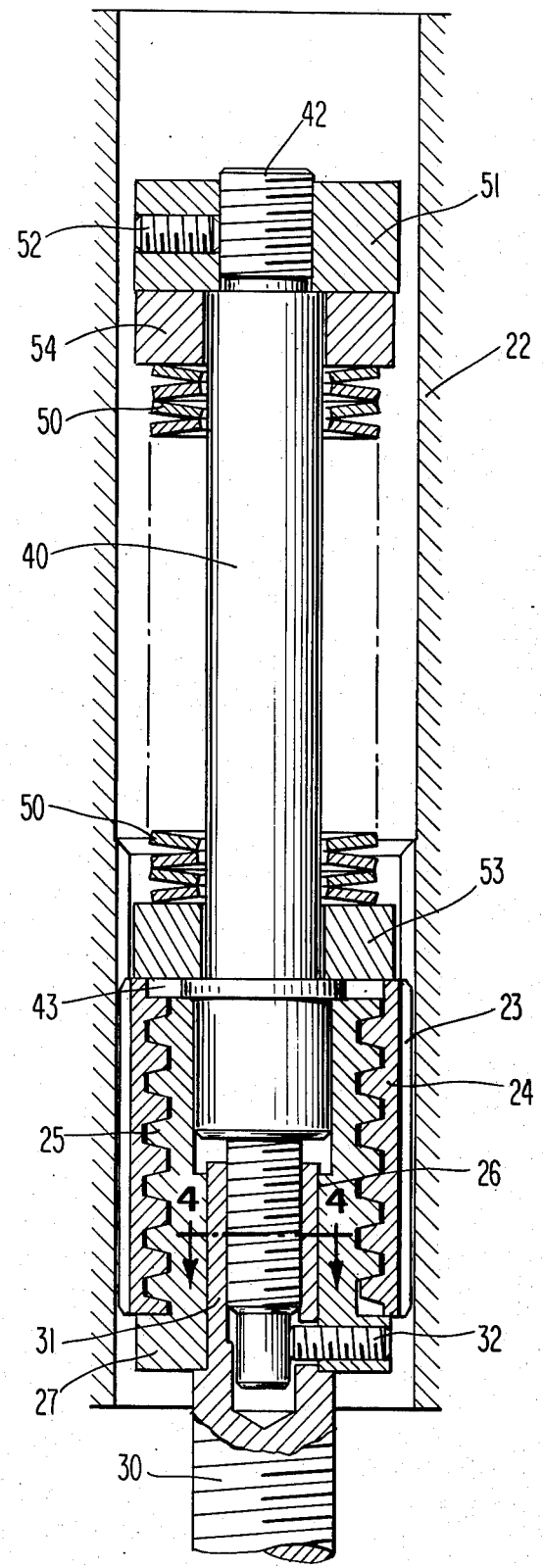
FIG. 2 is an enlarged side view, in section, of the protective means of FIG. 1.

In FIG. 1, worm 20 drives worm gear 21 which drives rotationally a drive sleeve 22 shown supported in thrust bearings 28 and 29. The lower end portion of drive sleeve 22 is internally splined at 23 and receives an externally-splined torque sleeve 24, as also seen in FIGS. 2 and 3. Splines 23 allow for relative movement in the axial direction between drive sleeve 22 and torque sleeve 24. Torque sleeve 24 is threaded internally and is in mesh with an externally threaded drive nut 25. As seen in FIGS. 2 and 4, the lower portion of drive nut 25 is provided with a square hole 26 and valve stem 30 is provided with a square upper end portion 31 which fits within square hole 26 of nut 25.

The square upper end portion 31 of valve stem 30 has an internally-threaded central bore which receives the externally-threaded lower portion 41 of stem-extension member 40. A set screw 32 prevents stem-extension member 40 from rotating in a loosening direction on stem end 31.

Stem-extension member 40 functions as a support and guide for a set of pre-loaded Belleville springs 50 which extend between a lower thrust washer 53 and an upper thrust washer 54. The lower thrust washer 53 is supported on an annular flange 43 on the stem extension 40. The upper thrust washer 54 is retained by a lock nut 51 which is threaded on to the externally-threaded end portion 42 of stem extension 40. Set screw 52 prevents rotation of lock nut 51 relative to the threaded end portion 42 of the extension 40.

In operation, when worm gear 21 (FIG. 1) is driven rotationally by the power-driven worm 20 in a direction to close the valve, the mechanism shown supported on the thrust bearings 28 and 29 rotates as a unit. Until the valve seats there is no relative rotational movement between the component parts. Drive sleeve 22 rotates, and so does torque sleeve 24, drive nut 25, valve stem 30, stem extension 40, washers 53 and 54, Belleville springs 50, and lock nut 51.

It will be seen in FIG. 1, that when the valve stem 30 is driven rotationally, by the means just described, the stem 30 rotates relative to nut 15 in valve V, and since the valve nut 15 is fixed axially, the valve stem 30 necessarily either rises or descends relative to the valve nut 15 according to the direction of stem rotation.

Assume that worm gear 21 is being driven in a direction to cause valve stem 30 to move downwardly in valve nut 15. The driving worm gear 21 and drive sleeve 22 are fixed against axial movement in the housing H. Accordingly, worm gear 21 and drive sleeve 22 do not move downwardly when valve stem 30 moves axially downwardly. This downward movement of stem 30 places a downward pull on drive nut 25 and this places a downward pull on torque sleeve 24. Since torque sleeve 24 is splined, by vertical splines, to drive sleeve 22, torque sleeve 24 slides downwardly on the splines 23. This action continues until the valve closure element 12 seats on valve seat 10.

When the torque-sensing mechanism (not shown) senses that the valve closure element 12 has seated in valve seat 10, an electrical switch is operated to shut off the power to the drive motor. However, as indicated above, the kinetic energy of the inertial forces causes the drive motor to continue rotating, and unless prevented from so doing, the over-running motor will continue to drive the valve stem 30 rotationally in fixed nut 15, thereby continuing to drive valve stem 30 downwardly, thereby continuing to apply a downward force on a valve which has now been completely closed. The reaction force of the now fully-closed valve is applied in an upward direction to valve stem 30 and offers substantial resistance to continued rotation of the valve stem.

As a result, valve stem 30 and its drive nut 25 stop, or almost stop, rotating. However, since the drive worm gear 21, drive sleeve 22 and torque sleeve 24 continue to rotate, relative angular movement takes place between torque sleeve 24 and drive nut 25. This is illustrated in FIG. 3. The threads of the rotating sleeve 24 are now cammed upwardly on the threads of the non-rotating (or at least much more slowly rotating) drive nut 25. This is indicated by the arrows (a) in FIG. 3. (It is assumed that torque sleeve 24 is rotating in the clockwise direction, as viewed looking down from the top of the equipment). As a result, torque sleeve 24 moves upwardly on the vertical splines 23. This is indicated by the arrow (b) in FIG. 3. The upward movement of sleeve 24 applies an upward thrust on the lower thrust washer 53, causing the set of Belleville springs 50 to compress against the upper thrust washer 54. This action continues until the over-running drive motor stops rotating. In FIG. 3, the torque sleeve 24 is shown to have risen substantially above its initial position shown in FIG. 2. Thus, the kinetic energy of the over-running motor has been absorbed by the Belleville springs 50.

Consider now what happens when the closed valve is to be opened. In the preceding description, it is assumed that to close the valve the drive sleeve 22 and the torque sleeve 24 are driven in the clockwise direction, as viewed looking down in FIGS. 1-3. To open the valve, the drive means is, of course, driven in the opposite direction. When the drive sleeve 22 and torque sleeve 24 are rotated counter-clockwise, as viewed looking down in FIGS. 1-3, and because of the downward thrust on torque sleeve 24 exerted by the compressed Belleville springs 50, the torque sleeve 24 rotates relative to the drive nut 25. During this action, the drive nut 25 does not rotate, and torque sleeve 24 moves downwardly on the vertical splines 23 until the torque sleeve 24 abuts against flange 27 of the drive nut 25. At this time, the set of Belleville springs 50 has expanded to its original pre-loaded condition. Further rotation of torque sleeve 24 in the counter-clockwise direction causes drive nut 25 to rotate in the same counter-clockwise direction and at the same rate of rotation. Rotation of drive nut 25 drives valve stem 30 rotationally in a direction to cause the valve stem 30 to rise in the valve nut 15, thereby opening the valve.

While the protective mechanism of the present invention has been described and illustrated as applicable to power driven valve stems, the mechanism has broader applications. In general, the mechanism may be used wherever a torque force is applied to the external threads of a shaft, or to other form of inclined camming surface on the shaft, to cause angular and/or axial movement of the shaft, where it is desired to protect against the application by the shaft of thrust or torque forces in excess of a preselected magnitude.

What is claimed is:

1. An energy-absorbing valve protective mechanism for protecting a valve against the application of excessive thrust or torque by an axially-movable rotatable shaft driven by a power drive which tends to overdrive in the valve-closing direction, said protective mechanism comprising:
    a. a valve housing;
    b. a drive housing mounted on and fixed to said valve housing;
    c. a nut fixed in said valve housing against axial and rotational displacement;
    d. an externally-threaded rotatable stem threaded through said nut for axial movement relative to said nut in response to rotation of said stem;
    e. an internally-keyed drive sleeve mounted for rotation in said drive housing but fixed against axial displacement;
    f. power drive means for driving said drive sleeve rotationally, said power drive means including a gear connected to said drive sleeve, said gear being fixed in said drive housing against axial movement;
    g. an externally-keyed internally-threaded torque sleeve coaxially disposed with said drive sleeve and in keyed engagement therewith, said torque sleeve being adapted to be driven rotationally by said drive sleeve, said torque sleeve being movable axially on said keys relative to said drive sleeve;
    h. external thread means on said stem in engagement with the threads of said torque sleeve and adapted to be driven rotationally by the threads of said torque sleeve;
    i. a stem extension in said drive housing fixed to and projecting beyond the driven end of said stem, said stem extension being rotatable with, and movable axially with, said stem;
    j. energy-absorbing compression spring means supported coaxially on said stem extension and rotatable therewith;
    k. said spring means being disposed in the path of axial movement of said torque sleeve so as to be compressed by axial movement of said torque sleeve relative to said stem for absorbing the kinetic energy of the torque applied to said torque sleeve after said stem has reached a valve-closed position, thereby inhibiting further rotational or axial movement of said stem, and thereby causing said torque sleeve to move axially relative to said stem.

2. A mechanism according to claim 1 wherein said energy-absorbing compression spring means includes Belleville washers.

3. A mechanism according to claim 1 wherein said drive sleeve is in splined engagement with said torque sleeve.

4. An energy-absorbing valve protective mechanism for operative association with a valve housing having therein a valve seat, a valve closure element at one end of an externally threaded rotatable stem which extends through and projects beyond said housing, and threaded means fixed in said housing in engagement with said stem, said protective mechanism adapted for protecting said valve and valve seat against the application of excessive thrust or torque by the axially-movable rotatable stem when driven rotationally by a power drive which tends to overdrive in the valve-closing direction, said protective mechanism comprising:
    a. a drive housing adapted for mounting on said valve housing;
    b. an internally-keyed drive sleeve mounted for rotation in said drive housing but fixed against axial displacement;
    c. power drive means for driving said drive sleeve rotationally;
    d. an externally-keyed internally-threaded torque sleeve coaxially disposed with said drive sleeve and in keyed engagement therewith, said torque sleeve being adapted to be driven rotationally by said drive sleeve, said torque sleeve being movable axially on said keys relative to said drive sleeve;

e. external thread means on said stem in engagement with the threads of said torque sleeve and adapted to be driven rotationally by the threads of said torque sleeve;

f. a stem extension in said drive housing fixed to and projecting beyond the driven end of said stem, said stem extension being rotatable with, and movable axially with, said stem;

g. energy-absorbing compression spring means supported coaxially on said stem extension and rotatable therewith;

h. said spring means being disposed in the path of axial movement of said torque sleeve so as to be compressed by axial movement of said torque sleeve relative to said stem for absorbing the kinetic energy of the torque applied to said torque sleeve after said stem has reached a valve-closed position, thereby inhibiting further rotational or axial movement of said stem, and thereby causing said torque sleeve to move axially relative to said stem.

5. An energy-absorbing valve protective mechanism for protecting a valve against the application of excessive thrust or torque by an axially-movable rotatable shaft driven by a power drive which tends to overdrive in the valve-closing direction, said protective mechanism comprising:

a. a valve housing;

b. a drive housing mounted on and fixed to said valve housing;

c. a nut fixed in said valve housing against axial and rotational displacement;

d. an externally-threaded rotatable stem threaded through said nut for axial movement relative to said nut in response to rotation of said stem;

e. an internally-keyed drive sleeve mounted for rotation in said drive housing but fixed against axial displacement;

f. power drive means for driving said drive sleeve rotationally, said power drive means including a gear connected to said drive sleeve, said gear being fixed in said drive housing against axial movement;

g. an externally-keyed internally-threaded torque sleeve coaxially disposed with said drive sleeve and in keyed engagement therewith, said torque sleeve being adapted to be driven rotationally by said drive sleeve, said torque sleeve being movable axially on said keys relative to said drive sleeve;

h. external thread means on said stem in engagement with the threads of said torque sleeve and adapted to be driven rotationally by the threads of said torque sleeve;

i. a stem extension in said drive housing fixed to and projecting beyond the driven end of said stem, said stem extension being rotatable with, and movable axially with, said stem;

j. energy-absorbing compression spring means supported coaxially on said stem extension and rotatable therewith;

k. said spring means being disposed in the path of axial movement of said torque sleeve so as to be compressed by axial movement of said torque sleeve relative to said stem for absorbing the kinetic energy of the torque applied to said torque sleeve after said stem has reached a valve-closed position, thereby inhibiting further rotational or axial movement of said stem, and thereby causing said torque sleeve to move axially relative to said stem;

l. said stem has an integral non-threaded end portion having a square cross section;

m. said external thread means on said stem comprises an externally-threaded annular member having a square axial hole corresponding to, and adapted to receive, the non-threaded end portion of said stem.

6. A mechanism according to claim 5 wherein:

a. said non-threaded end portion of said stem is provided with a threaded axial hole;

b. said stem extension has a threaded end portion adapted to be received within the threaded axial hole of said stem end portion.

7. A valve protective mechanism according to claim 6 wherein:

a. said spring means is provided with retaining washers;

b. said stem extension is provided with an annular flange for supporting one spring-means retaining washer.

8. Apparatus according to claim 7 wherein:

a. the outer diameter of said stem-extension flange is smaller then the inner diameter of said torque sleeve;

b. the outer diameter of said spring-means retaining washer is larger than the inner diameter of said torque sleeve; thereby to allow said torque sleeve to move axially past said flange to compress said spring means.

9. An energy-absorbing valve protective mechanism for operative association with a valve housing having therein a valve seat, a valve closure element at one end of an externally threaded rotatable stem which extends through and projects beyond said housing, and threaded means fixed in said housing in engagement with said stem, said protective mechanism adapted for protecting said valve and valve seat against the application of excessive thrust or torque by the axially-movable rotatable stem when driven rotationally by a power drive which tends to overdrive in the valve-closing direction, said protective mechanism comprising:

a. a drive housing adapted for mounting on said valve housing;

b. an internally-keyed drive sleeve mounted for rotation in said drive housing but fixed against axial displacement;

c. power drive means for driving said drive sleeve rotationally;

d. an externally-keyed internally-threaded torque sleeve coaxially disposed with said drive sleeve and in splined engagement therewith, said torque sleeve being adapted to be driven rotationally by said drive sleeve, said torque sleeve being movable axially on said splines relative to said drive sleeve;

e. external thread means on said stem in engagement with the threads of said torque sleeve and adapted to be driven rotationally by the threads of said torque sleeve;

f. a stem extension in said drive housing fixed to and projecting beyond the driven end of said stem, said stem extension being rotatable with, and movable axially with, said stem;

g. energy-absorbing compression spring means supported coaxially on said stem extension and rotatable therewith;

h. said spring means being disposed in the path of axial movement of said torque sleeve so as to be compressed by axial movement of said torque sleeve relative to said stem for absorbing the kinetic energy of the torque applied to said torque sleeve after said stem has reached a valve-closed position, thereby inhibiting further rotational or axial movement of said stem, and thereby causing said torque sleeve to move axially relative to said stem;

i. said stem has an integral non-threaded end portion having a square cross section;

j. said external thread means on said stem comprises an externally-threaded annular member having a square axial hole corresponding to, and adapted to receive, the non-threaded end portion of said stem.

10. A mechanism according to claim 9, wherein:

a. said non-threaded end portion of said stem is provided with a threaded axial hole;

b. said stem extension has a threaded end portion adapted to be received within the threaded axial hole of said stem end portion.

* * * * *